United States Patent [19]

Glemser et al.

[11] Patent Number: 4,913,989
[45] Date of Patent: Apr. 3, 1990

[54] POSITIVE COLLECTOR ELECTRODE FOR BATTERIES WITH ALKALINE ELECTROLYTES

[75] Inventors: Oskar Glemser; Dieter H. Buss, both of Gottingen; Jürgen Bauer, Hildesheim; Helga Low, Vorstetten, all of Fed. Rep. of Germany

[73] Assignee: Varta Batterie Aktiengesellschaft, Hanover, Fed. Rep. of Germany

[21] Appl. No.: 334,916

[22] Filed: Apr. 7, 1989

[30] Foreign Application Priority Data

Apr. 8, 1988 [DE] Fed. Rep. of Germany ....... 3811717

[51] Int. Cl.$^4$ .............................................. H01M 4/48
[52] U.S. Cl. ................................... 429/218; 429/222; 429/223; 252/182.1
[58] Field of Search ............... 429/218, 221, 222, 223, 429/229, 231, 206; 252/182.1

[56] References Cited

U.S. PATENT DOCUMENTS

| | | | |
|---|---|---|---|
| 4,224,392 | 9/1980 | Oswin | 429/223 X |
| 4,603,094 | 7/1986 | Yasuda | 429/223 X |
| 4,696,875 | 9/1987 | Glemser et al. | 429/206 |
| 4,735,629 | 4/1988 | Glemser et al. | 429/206 X |

Primary Examiner—Anthony Skapars
Attorney, Agent, or Firm—Weiser & Stapler

[57] ABSTRACT

A positive collector electrode with an active material which comprises a double hydroxide of the general formula $$[M^{2+}{}_{(1-x)}Fe^{3+}{}_x(OH)_2]^{x+}[(x/n)X^{n-}, yH_2O]^{x-}$$

in which the transient parameter is $0.05 \leq x \leq 0.4$, preferably 0.2, $M^{2+}$ is preferably $Ni^{2+}$, and $X^{n-}$ is an anion species, shows a remarkable improvement in electrical behavior as compared to analogous double hydroxides in which $X^{n-}$ is $SO_4^{2-}$, $NO_3^-$ or $CO_3^{2-}$. These electrodes, known as siderophile electrodes, exhibit resistance to iron contamination if $X^{n-}$ is formed at least partly by $PO_4^{3-}$ or $HPO_4^{2-}$. This improvement is manifested in a constancy of the specific discharge capacity at a high level over many cycles during charge/discharge operation as compared to a $Cd/Cd(OH)_2$ electrode. The process for producing the electrode is also disclosed.

9 Claims, 1 Drawing Sheet

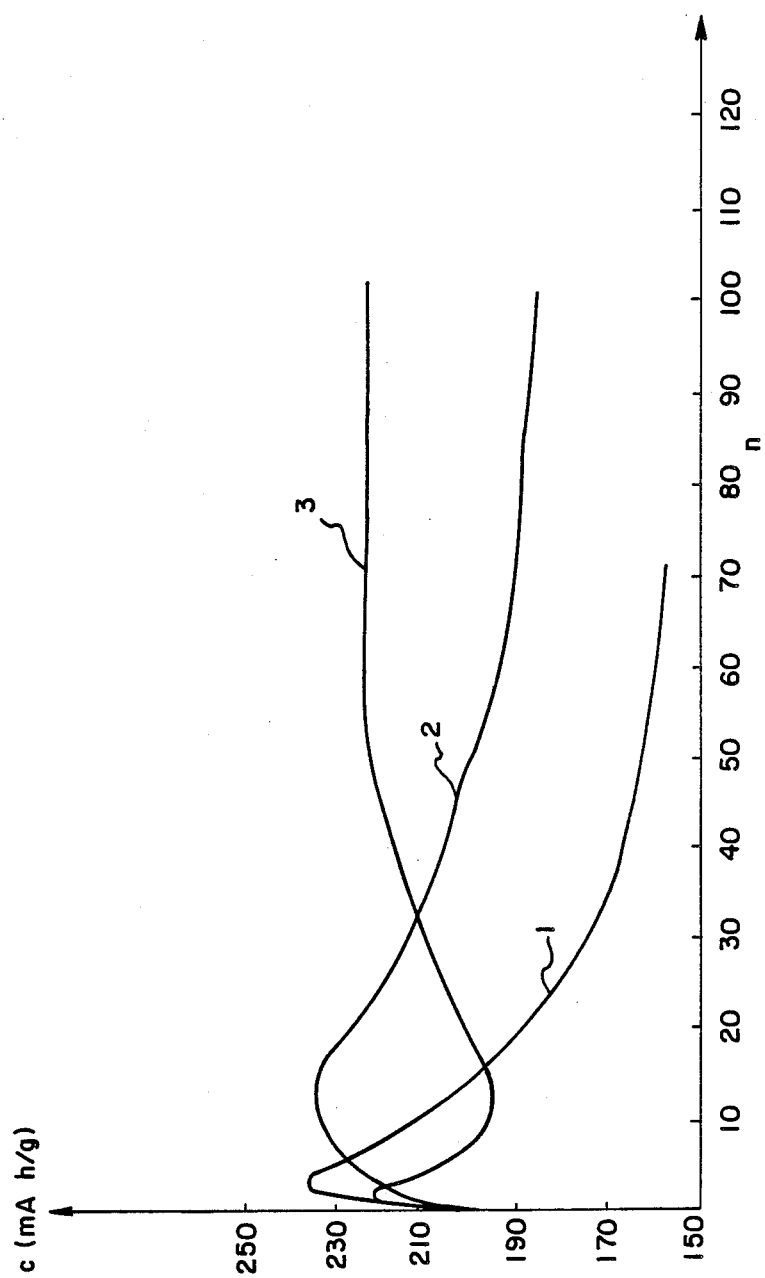

POSITIVE COLLECTOR ELECTRODE FOR BATTERIES WITH ALKALINE ELECTROLYTES

BACKGROUND OF THE INVENTION

The invention relates generally to a positive collector electrode for batteries with alkaline electrolytes and a process for producing it.

DE-OS No. 35 02 108 has disclosed a positive collector electrode, whose active material comprises a double hydroxide of the general formula $$[M^{2+}{}_{(1-x)}Fe^{3+}{}_x(OH)_2]^{x+}[(x/n)X^{n-}, yH_2O]^{x-}$$

in which the transient parameter x can assume values between 0.05 and 0.4, $M^{2+}$ is an oxidizable and reducible cation, and $X^{n-}$ is at least any desirable anion species serving for charge compensation of the complex double hydroxide-type cation. $M^{2+}$ is perferably $Ni^{2+}$ or $Co^{2+}$, while $X^{n-}$ may be the anions $NO_3^-$, $SO_4^{2-}$ or $CO_3^{2-}$.

The effort to stem the harmful effect of iron contamination on the function of the nickel electrode lead to the discovery of this double hydroxide and the idea that it should be used as the active material for positive electrodes in alkaline Ni-Fe batteries. In the case of the Edison battery, the principal source of iron contamination is, of course, its negative iron/iron hydroxide electrode. Additionally the various electrode reinforcements in Ni/Cd batteries, whether they are supports made of nickel-plated steel strip or nickel-plated steel fiber mats, will also give rise to the release of iron, as soon as the nickel plating has became defective or porous.

The harmful effect of iron is manifested by a reduction of the charging efficiency of the nickel electrode in a state of electrode oxidation that does not correspond to full charging. This effect is assumed to be caused by the electrophoretic deposition of colloidal iron aquoxide particles containing trivalent iron or iron of lower valency on the nickel hydroxide surface during the charging process, since these particles impart a lower oxygen overvoltage to the electrode. As a result, the electrode takes up less charge. DE-OS No. 35 20 108 discusses some of the reference sources which prove this hypothesis and also explains the formation of the iron aquoxide particles.

The close crystal chemical similarity to the mineral pyroaurite is very significant for this known double hydroxide; they have the same double layer structure and analogous composition, and the position of $M^{2+}$ in the complex cation is occupied by $Mg^{2+}$ and $1/nX^{n-1}$ by $1/2CO_3^{2-}$. This double layer structure (cf. Allmann, R.: *Chimia* 24, 99–108 (1970)) derives from the fracture lattice of Beta-Ni(OH)$_2$ and thereby the nickel layers in the M(OH)$_2$ layers (M=Ni) can also be occupied in a statistical distribution by other cations $M^{2+}$ and $M^{3+}$ so long as they are approximately of equal size. The charge excess introduced by the highly charged trivalent metal cations into the principal layers is now equalized by the $X^-$ anions. This charge equalization is facilitated by the hydroxyl ions of a principal layer which carry a charge $-1$ due to a reduction of their bond strength corresponding to a charge $<1$, because of the altered environment of $M^{2+}$ and $M^{3+}$ ions. This enables these hydroxyl ions to compensate charges $>1$, and for the H atom of an M—OH bond, to be partially bound by another strong negative atom X. The result of this is the formation of hydrogen bridges O—H . . . X. Together with $H_2O$ molecules, $X^-$ ions are pushed between the original brucite layers, so that an ionic structure with a succession of principal layers consisting of $[M^{2+}{}_{1-x}M^{3+}{}_x(OH)_2]^{x+}$-layer cations and $[x/nX^{n-}, yH_2O]^{x-}$ intermediate layer anions (hence "double layer structure") is formed.

It was demonstrated by experiments carried out with electrochemical test cells of the Ni/Fe or Ni/Cd system that electrodes were immune to iron contamination when produced from such a double hydroxide, that is with the empirical composition of $Ni_4Fe(OH)_{10}NO_3$ (which is obtained according to the general formula presented earlier) if x=0.2, when used in place of ordinary nickel hydroxide electrodes. This insensitivity was shown by the fact that the current efficiencies in the cycling experiment were higher from the beginning in the case of double hydroxide electrodes and decreased much less with increasing cycling duration than in the case of the corresponding reference electrodes comprising of 100% iron-free Ni(OH)$_2$.

A similar behavior was also shown by double hydroxide electrodes which contained $SO_4$ or $CO_3$, instead of $NO_3$, which had been prepared by simultaneous precipitation of $Ni^{2+}$ and $Fe^{3+}$ ions from solutions of the corresponding metal salts by potassium hydroxide, and in which nickel sulfate or nickel carbonate was used as the starting material, in addition to the corresponding iron compounds.

It was also found that the percentage of Ni calculated as pure Ni(OH)$_2$ in the double hydroxide ensures, at least at the beginning of the cycling test, a current efficiency that is very close to the theoretical Faraday efficiency of 289 mAh/g Ni(OH)$_2$. This suggest that the nickel is charged to a state beyond the trivalent state in the presence of iron, which does not itself participate in the redox processes.

The behavior of the positive double hydroxide electrode, which is evidently unaffected by the harmful effects of iron, was taken into account in naming the "siderophile electrode" (siderophile = iron-friendly). Nevertheless, better capacity utilization during longer cycle lives, which is of great practical interest, has continued to be desirable.

SUMMARY OF THE INVENTION

It is a principal object of the present invention to provide a positive collector electrode which has improved current efficiency or capacity utilization after increased and prolonged charge/discharge operation.

It is also an object of the invention to provide a positive collector electrode which is unaffected by the harmful effects of iron such as iron contamination (i.e., siderophile electrode).

It is also an object of the invention to provide processes for producing the positive collector electrode.

In accordance with the present invention, these and other objects are achieved in positive collector electrodes with alkaline electrolytes by providing an active paste in the non-charged state which comprises a double hydroxide of the general formula $$[M^{2+}{}_{(1-x)}Fe^{3+}{}_x(OH)_2]^{x+}[(x/n)X^{n-}, yH_2O]^{x-}$$

in which the transient parameter x can assume values between 0.05 and 0.4, $M^{2+}$ is an oxidizable and reducible cation, and $X^{n-}$ is an anion serving for charge compensation of the complex double hydroxide-type cation, wherein $X^{n-}$ is formed at least partly by $PO_4^{3-}$ or $HPO_4^{2-}$. The double hydroxide is formed by precipitating the M and Fe double hydroxide in the presence of $PO_4^{-3}$ from a salt solution with alkali.

The improvement in the constancy of the discharge capacity at a high level over many cycles of the electrode disclosed in this invention over $Cd/Cd(OH)_2$ electrodes is evident.

Further detail regarding a preferred positive collector electrode and processes for producing it in accordance with the present invention may be had with reference to the detailed description provided below.

BRIEF DESCRIPTION OF THE DRAWINGS

The single FIGURE provided illustrates the contents of Table 2 in graphic form, showing a comparison of the discharge capacities of various double hydroxide positive electrodes as a function of cycle number.

DETAILED DESCRIPTION OF THE PREFERRED EMBODIMENTS

This invention calls for a positive collector electrode where active material consists of a double hydroxide of the general formula

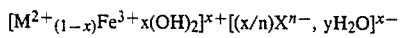
$$[M^{2+}{}_{(1-x)}Fe^{3+}{}_x(OH)_2]^{x+}[(x/n)X^{n-}, yH_2O]^{x-}$$

in which the transient parameter x can assume values between 0.05 and 0.4, $M^{2+}$ is an oxidizable and reducible cation, and $X^{n-}$ is an anion formed at least partly by $PO_4^{3-}$ or $HPO_4^{2-}$.

When $X^{n-}$ is formed by $PO_4^{3-}$ in a molar percentage of 30%–100% surprisingly favorable results are obtained.

A particularly advantageous effect is achieved with $PO_4^{-3}$ accounting for between 40% and 60% of $X^{n-}$. In a preferred embodiment of the invention the active material of the collector electrode is a double hydroxide according to the formula presented above where $PO_4^{3-}$ accounts for about half the anion $X^{n-}$, with the other half accounted for by another anion species, e.g., $SO_4^{2-}$.

Thus, it should be noted that the objects of the invention are accomplished when $X^{-n}$ is formed at least partly by $PO_4^{-3}$ and $HPO_4^{-2}$.

In another preferred embodiment of the invention the above presented double hydroxide formula is obtained if the transient parameter x is 0.2 and $M^{2+}$ is $Ni^{2+}$ or $Co^{2+}$.

Further according to the present invention, a M, Fe double hydroxide such as a Ni,Fe double hydroxide, is prepared by simultaneous precipitation of $Ni^{2+}$ and $Fe^{3+}$ ions in the presence of $PO_4^{3-}$ ions from a salt solution with alkali. For example, a phosphoric acid solution of nickel sulfate and iron sulfate is used whose molar ratio is selected such that a Ni/Fe atom ratio between 95/5 and 60/40, preferably about 80/20, is obtained in the double hydroxide, depending on the desired composition of the precipitate ($0.05 \leq x \leq 0.4$). The molar ratio of the $Ni^{2+}$ and $Fe^{3+}$ ions in the precipitating solution is consequently between 19:1 and 1.5:1.

For example, in a laboratory experiment, a solution of nickel sulfate (0.763 mole/L) and iron (III) sulfate (0.191 mole/L) acidified with phosphoric acid $H_3PO_4$ (0.191 mole/L) was precipitated with potassium hydroxide (5.52 moles/L) in a collector that contained potassium sulfate (0.76 mole/L).

A multiple-neck glass flask containing an aqueous KOH solution with the pH value selected for precipitation was used to carry out the precipitation under the conditions of pH=12.5 and temperature =304–306 K. The solution was stabilized at 305 K by a thermostat. A carbonate-free 1-3 M KOH solution was injected by means of diaphragm pumps into the flask together with the $PO_4$ solution containing the metal salt while stirring. Deviations of the pH value from the nominal value of 12.5 were automatically corrected with dilute potassium hydroxide or 1 M phosphoric acid to a permissible variation of ±0.1 pH units.

The suspension was stirred for another eight to ten hours after the end of the precipitation. The reaction product was subsequently transferred through a flexible tube directly into a glove box swept with nitrogen. The reaction product was then filled into closeable centrifuge beakers made of polypropylene and centrifuged in a laboratory centrifuge outside the glove box for ten minutes at 3,000 rpm. After the specimens had been washed approximately four times with either a KOH solution having the pH value of the precipitation reaction or with twice-distilled water, the purified product was introduced into a desiccator inside the glove box and dried at room temperature for three days under a pressure of 10 mbars.

The precipitation of the double hydroxide can also be carried out under conditions where the precipitation is carried out at the pH value of the isoelectric point of the hydroxide of the $M^{2+}$ ion actually used. The preferred reaction temperature of 304–306 K is stabilized against temperature fluctuations exceeding ±1 K by a thermostat in this case as well.

Porous sintered bodies as electrode supports can also be impregnated with the double hydroxide as the active positive material. Analagous to the prior-art technology of the manufacture of self-baking foil electrodes, collector electrodes are obtained by single-time or repeated impregnation of the sintered skeleton with the $H_3PO_4$-acidified metal salt solution containing $Ni^{2+}$ or $Co^{2+}$ and $Fe^{3+}$ and subsequent immersion into an alkali solution.

Carrying out the impregnation with a melt of the two metal salts in phosphoric acid and precipitating the double hydroxide by alkalization after solidification of the melt also falls within the scope of the present invention.

Finally, impregnation with aqueous metal salt solutions also makes it possible to carry out precipitation in self-baking electrodes according to an electrochemical method. The porous sintered body is connected as the cathode during the electrolysis process. Hydrogen ions are thus consumed and the cations present in the pores are precipitated in the form of the double hydroxide.

The double hydroxide produced according to the procedure described above can be described by the empirical formula

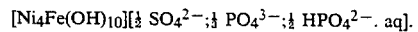
$$[Ni_4Fe(OH)_{10}][\tfrac{1}{4} SO_4^{2-}; \tfrac{1}{4} PO_4^{3-}; \tfrac{1}{4} HPO_4^{2-}. \text{ aq}].$$

The results of the chemical analysis of the preparation are shown in Table 1. The reference substance is Beta-$Ni(OH)_2$. The chemical analysis reveals a composition of the electrodes close to the ideal composition of the pyroaurite type.

It was possible to characterize the double hydroxide according to the invention by its X-ray diffractogram (CuKalpha radiation), in addition to the chemical analysis. The X-ray diffractogram shows pyroaurite-type broadened peaks. The lattice constants are on the order of magnitude characteristic of this structural type: a=308 pm, c=2,418 pm. Thus the diffractogram indicates the structural type of pyroaurite in which the lattice constants are in the characteristic dimensional range for this structural type.

1=[Ni$_4$Fe(OH)$_{10}$][NO$_3^-$. aq] as the positive electrode

2=[Ni$_4$Fe(OH)$_{10}$][½ SO$_4^{2-}$. aq] as the positive electrode

3=[Ni$_4$Fe(OH)$_{10}$][≃ SO$_4^{2-}$; ⅓ PO$_4^{3-}$; ½ HPO$_4^{2-}$. aq] as the positive electrode (according to the invention).

TABLE 1

| Specimen | Theoretically calculated % | | | | Wt. % found of | | | | Chemical composition molar ratio |
|---|---|---|---|---|---|---|---|---|---|
| | of Ni$^{2+}$ | Fe$^{3+}$ | SO$_4^{2-}$ | PO$_4^{3-}$ | Ni$^{2+}$ | Fe$^{3+}$ | SO$_4^{2-}$ | PO$_4^{3-}$ | |
| Ni/Fe/PO$_4$ | 43.5 | 10.3 | 8.9 | 5.9 | 38.0 | 8.7 | 6.5 | 5.8 | 4.1:1:0.4:0. |
| Ni(OH)$_2$ | 68.7 | | | | | | | | |

To investigate the electrochemical behavior and especially the iron resistance of the double hydroxide of the present invention, the specific discharge capacities (mAh/g) were measured during cyclic charging and discharging and compared to those of other double hydroxides in which X$^{n-}$ is not PO$_4^{-3}$ (desginated below by the short formulas Ni/Fe-SO$_4$ or Ni/Fe-NO$_3$). The reference substances were fully analoguous to the test substance, but they were prepared using metal salt solutions in sulfuric acid or nitric acid instead of phosphoric acid. The Ni/Fe atomic ratio of 80/20 was the same in all substances.

Test tubes with a length of about 10 cm and a diameter of 1 cm, which contained a mixture of 2.9 g test substance and 7 g nickel powder as the conducting material, with a nickel rod acting as the drain wire, were used as experimental electrodes. These experimental electrodes were placed in the center of a Plexiglas cylinder whose inside was lined with oversized negative counterelectrodes. The counterelectrode was either a heavily corroded Fe/Fe(OH)$_2$ electrode to forcibly produce iron poisoning or a Cd/Cd(OH)$_2$ electrode of the sintered foil type. The electrolyte used was a 30% KOH solution. The current conditions were kept the same: charging with 100 mA for 600 or 700 minutes and discharging with mA currents until reaching a cell voltage of 1 V or a potential of 0.1 V against Hg/HgO.

While the Ni/Fe-PO$_4$ electrode of this invention showed the same behavior with respect to the negative Fe/Fe(OH)$_2$ electrode as the Ni/Fe-SO$_4$ electrode and the Ni/Fe-NO$_3$ electrode, its specific discharge capacities with the Cd/Cd(OH)$_2$ counterelectrode were much higher than that of the electrodes not corresponding to the present invention. These measurements are reviewed in Table 2.

TABLE 2

Comparison of the discharge capacity (mAh/g) of the Ni/Fe—PO$_4$ electrode with the Ni/Fe—SO$_4$ and Ni/Fe—NO$_3$ electrodes.

| Cycle No. | Ni/Fe—PO$_4$ (according to the invention) mAh/g | Ni/Fe—SO$_4$ mAh/g | Ni/Fe—NO$_4$ mAh/g |
|---|---|---|---|
| 10 | 196 | 234 | 209 |
| 30 | 209 | 214 | 172 |
| 50 | 239 | 199 | 164 |
| 70 | 234 | 185 | 155 |
| 100 | 222 | 168 | — |
| 150 | 219 | — | — |

The figure shows the contents of Table 2 as a graph. In the figure:
n=cycle No.
c(mAh/g)=specific discharge capacity The substantially higher cycling stability of the phosphate-containing electrode is seen to be remarkable. Consequently, this electrode offers a decisive advantage over the other electrodes with SO$_4^{2-}$ or NO$_3^-$ in the double hydroxide intermediate layer. Another advantage is the fact that the double hydroxide paste of the invention can be manufactured with a greater tolerance, and concentrated solutions can be used. What is more, the siderophile nature or immunity of this phosphate containing electrode remains unchanged. As in the case of the other double hydroxides, up to 40 wt. % nickel hydroxide is saved.

A final examination of the lattice energy may explain the pronounced "phosphate" effect or the "acid phosphate" effect of the siderophile mixed hydroxide electrode of the present invention.

The electrochemical redox process in nickel hydroxide electrodes takes place as a proton/electron exchange mechanism. The proton exchange according to the chemical reaction Ni(OH)$_2$ NiOOH+e$^{31}$ +H$^+$ is only possible via the electrolytes. This mechanism is facilitate by the doping of the nickel hydroxide with M$^{3+}$ ions, since protonic states are only formed which are energetically distinguishable and which facilitate the proton exchange mechanism.

As explained earlier in connection with the pyroaurite structure, the positive charge excess introduced into the principal layers causes a reduction of the bond strength of the hydroxyl ions of one principal layer, which leads, on the other hand, to stronger binding of the hydroxide H atom to one of the oxygen-containing anions located in the unordered intermediate layer, e.g., OH$^-$, NO$_3^-$, SO$_4^{2-}$, PO$_4^{3-}$, as well as H$_2$O. The formation of hydrogen bridges means an increase in the proton availability in the intermediate layers. In addition, the electron conductivity is increased by the presence of M$^{2+}$ and M$^{3+}$ in the same crystallographic sites.

Because of the lower formal charging of the P atom of the PO$_4^{3-}$ group compared to the higher formal charging of the S atom of the SO$_4^{2-}$ group, the former form somewhat stronger hydrogen bridges than the latter. Since both SO$_4^{2-}$ and PO$_4^{3-}$ groups are incorporated in the anionic intermediate layer of the nickel hydroxide electrode described here, this intermediate layer will be characterized by a broader spectrum of proton energy states, which has a favorable effect on proton exchange. This is confirmed by the experiment.

Consequently, protonic states which lower the working potential of the electrode are additionally introduced by PO$_4^{3-}$ and HPO$_4^{2-}$, while the 0$_2$ separating potential remains unchanged; the phosphate acts as a "physical captor". This is another reason why the higher oxidation number of nickel in the phosphate-containing Ni/Fe hydroxide, represented by higher discharge capacities, is maintained over a much greater number of cycles than in the case of the $NO_3^-$ or $SO_4^{2-}$ containing double hydroxides.

We claim:

1. A positive collector electrode for batteries with alkaline electrolytes which provides for better current efficiency and capacity utilization by being immune to the harmful effects of iron contamination, which comprises an active paste which in the noncharged state is a double hydroxide of the general formula $$M^{2+}{}_{(1-x)}Fe^{3+}(OH)_2]^{x+}[(x/n)X^{n-}, yH_2O]^{x-}$$

in which the transient parameter x can assume values between 0.05 and 0.4, $M^{2+}$ is an oxidizable and reducible cation, and $X^{n-}$ is an anion formed at least partly by $PO_4^{3-}$ or $HPO_4^{2-}$.

2. The positive collector electrode in accordance with claim 1 wherein the molar percentage of $PO_4^{-3}$ in $X^{n-}$ is in the range of 30-100%.

3. The positive collector electrode in accordance with claim 1 wherein the molar percentage of $PO_4^{-3}$ in $X^{n-}$ is in the range of 40-60%.

4. The positive collector electrode in accordance with claim 1 wherein $X^{n-}$ comprises $PO_4^{3-}$ and one of the anion species selected from the group consisting of $SO_4^{2-}$ or $NO_3^-$.

5. The positive collector electrode in accordance with claim 1 wherein the transient parameter x is 0.2.

6. The positive collector electrode in accordance with claim 1 wherein $M^{2+}$ is $Ni^{2+}$.

7. The positive collector electrode in accordance with claim 1 wherein $M^{2+}$ is $Co^{2+}$.

8. The positive collector electrode in accordance with claim 1 wherein the double hydroxide has a double layer structure that corresponds to that of the mineral pyroaurite.

9. The positive collector electrode in accordance with claim 1 wherein the active paste is siderophile.

* * * * *